(12) United States Patent
Chubb et al.

(10) Patent No.: US 6,763,695 B1
(45) Date of Patent: Jul. 20, 2004

(54) SHEET MATERIAL CUTTER AND CUT-OFF GAUGE FOR USE IN COMBINATION WITH A SHEET BENDING BRAKE

(75) Inventors: Arthur Bryant Chubb, Dexter, MI (US); Norman Chubb, Carlton, MI (US); James E. Suyak, Riverview, MI (US); Arthur Bryant Chubb, II, Pinckney, MI (US)

(73) Assignee: J-Dan, Inc., Romulus, MI (US)

( * ) Notice: Subject to any disclaimer, the term of this patent is extended or adjusted under 35 U.S.C. 154(b) by 0 days.

(21) Appl. No.: 10/283,556

(22) Filed: Oct. 30, 2002

(51) Int. Cl.$^7$ ............................. B21D 5/04; B21D 43/28
(52) U.S. Cl. ............................. 72/294; 72/319; 83/455
(58) Field of Search .................. 72/294, 319; 83/455, 83/614

(56) References Cited

U.S. PATENT DOCUMENTS

| | | | | |
|---|---|---|---|---|
| 417,167 A | * | 12/1889 | Gibbon | 83/455 |
| 513,851 A | * | 1/1894 | Wheeler | 83/614 |
| 727,895 A | * | 5/1903 | Byde | 83/455 |
| 1,572,304 A | * | 2/1926 | Morton | 83/455 |
| 1,624,590 A | * | 4/1927 | Fleming | 83/614 |
| 3,821,915 A | * | 7/1974 | Larrable | 83/455 |
| 3,981,215 A | * | 9/1976 | Granger et al. | 83/455 |
| 4,131,046 A | * | 12/1978 | Strohmeyer | 83/471.2 |
| 5,174,349 A | * | 12/1992 | Svetlik et al. | 144/286.5 |
| 5,582,053 A | | 12/1996 | Chubb | 72/294 |
| 5,706,693 A | | 1/1998 | Chubb | 72/294 |
| 6,000,268 A | | 12/1999 | Van Cleave | 72/294 |
| 6,644,158 B2 | * | 11/2003 | Cleave et al. | 83/455 |

FOREIGN PATENT DOCUMENTS

FR        2504429   * 10/1982 .................. 72/294

* cited by examiner

Primary Examiner—Daniel C. Crane
(74) Attorney, Agent, or Firm—Reising, Ethington, Barnes, Kisselle, P.C.

(57) ABSTRACT

A sheet material cutter and bending brake combination includes a sheet bending brake having a base member with a clamp surface, and an anvil member for clamping sheet material against the clamp surface. The anvil member has a track extending longitudinally of the anvil member and the brake. The track includes a pair of parallel channels that are at an angle to each other, and are laterally spaced from each other—i.e., laterally of the longitudinal dimension of the brake and the longitudinal direction of the track. The track also includes a second channel extending along the anvil member parallel to the first channel and disposed between the lip and the clamp surface. A cutter has a frame, and first and second pairs of track rollers mounted on the frame. The first pair of track rollers have outwardly extending peripheries for receipt in the first channel, and the second pair of track rollers have outwardly extending peripheries for receipt in the second channel. A pair of cutter rollers on the frame are disposed for engagement with sheet material clamped between the anvil and base members when the cutter is mounted on the track. The track and track roller geometries provide affirmative wheel locking in the track, which reduces any tendency of the cutter to become untracked as the cutter is propelled along the sheet bending brake.

6 Claims, 5 Drawing Sheets

SHEET MATERIAL CUTTER AND CUT-OFF GAUGE FOR USE IN COMBINATION WITH A SHEET BENDING BRAKE

The present invention is directed to a sheet material cutter for use in combination with a sheet bending brake having one or more track features for guiding the cutter along the brake, and to a gauge for locating the sheet material to be cut in the sheet bending brake.

BACKGROUND AND SUMMARY OF THE INVENTION

Portable sheet bending brakes generally include a support with a plurality of C-shaped fame sections. An elongated base member is mounted on the lower arms of the frame sections to form a clamp surface, and an elongated anvil member is mounted on bars pivotally secured to the upper arms of the frame sections for clamping sheet material against the clamp surface on the base member. A bend member is pivotally mounted to the base member for bending over the edge of the anvil member sheet material clamped between the anvil member and the base member. The anvil member is provided with one or more longitudinally extending track features for guiding a manual cutter along the anvil member so as to sever or slice strips of material from sheet stock clamped between the anvil and base members. However, it is difficult to guide the cutter and maintain the cutter on the anvil member track, particularly when the operator seeks to stand directly in front of the brake as the cutter is moved along the bending brake.

A sheet material cutter and bending brake combination in accordance with one aspect of the present invention includes a sheet bending brake having a base member with a clamp surface, and an anvil member for clamping sheet material against the clamp surface. The anvil member has a track extending longitudinally of the anvil member and the brake. The track includes a pair of parallel channels that are at an angle to each other, and are laterally spaced from each other—i.e., laterally of the longitudinal dimension of the brake and the longitudinal direction of the track. A cutter has a frame, and first and second pairs of track rollers mounted on the frame. The first pair of track rollers have outwardly extending peripheries for receipt in the first channel, and the second pair of track rollers have outwardly extending peripheries for receipt in the second channel. A pair of cutter rollers on the frame are disposed for engagement with sheet material clamped between the anvil and base members when the cutter is mounted on the track. The track and track roller geometries provide affirmative wheel locking in the track, which reduces any tendency of the cutter to become untracked as the cutter is propelled along the sheet bending brake.

BRIEF DESCRIPTION OF THE DRAWING

The invention, together with additional objects, features, advantages and aspects thereof, will be best understood from the following description, the appended claims and the accompanying drawings in which:

DETAILED DESCRIPTION OF PREFERRED EMBODIMENTS

Figure 1:
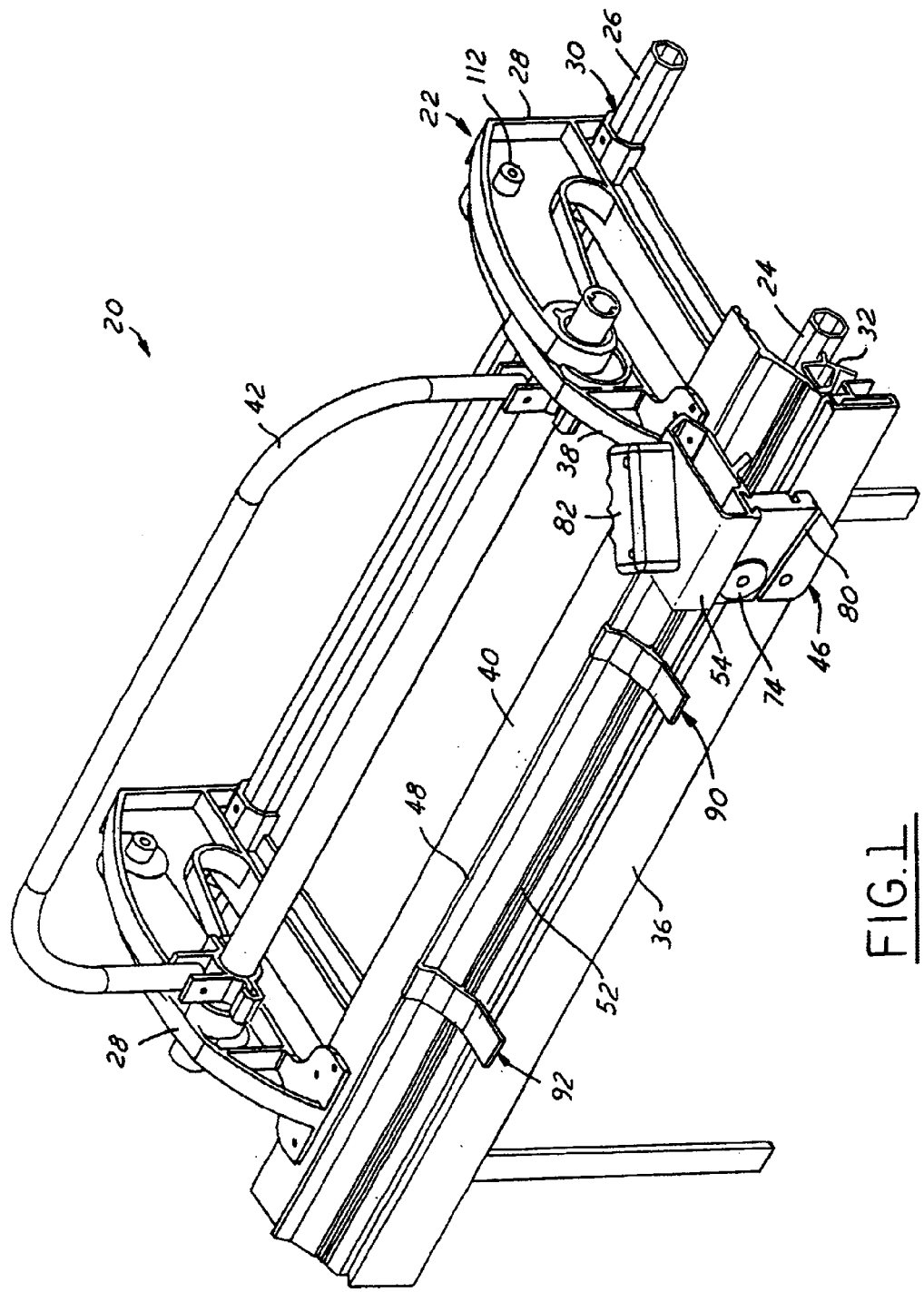
FIG. 1 is a front perspective view of a sheet material cutter and bending brake combination in accordance with one exemplary but presently preferred embodiment of the invention.
Figure 2:
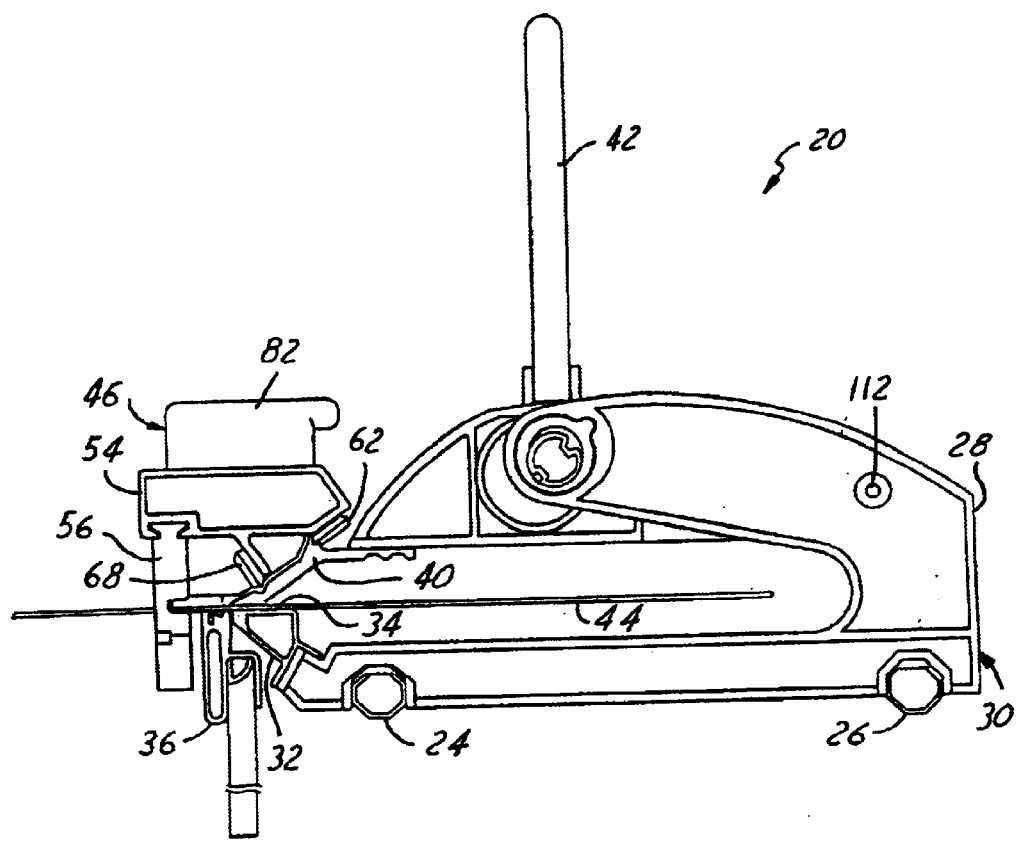
FIG. 2 is an end elevational view of the cutter and bending brake combination illustrated in FIG. 1.

FIGS. 1–2 illustrate a sheet material cutter and bending brake combination 20 in accordance with one exemplary but presently preferred embodiment of the invention. A portable sheet bending brake 22 includes elongated front and rear rails 24, 26. A plurality of frame sections 28 are disposed in a longitudinally spaced array and secured to rails 24, 26. Rails 24, 26 and frame sections 28 thus form a rigid elongated generally rectangular frame 30, in which frame sections 28 hold rails 24, 26 in spaced apart parallel position. Each frame section 28 is generally C-shaped in lateral view (FIG. 2). An elongated base member 32 is secured to the forward ends of the lower arms of the several frame sections 28. Base member 32 has a flat upper surface 34 that forms a clamp surface for sheet material. An elongated bend member 36 is pivotally mounted by a hinge rod to base member 32 at a position adjacent to the forward edge of clamp surface 34. A bar or arm 38 is pivotally mounted to the upper arm of each frame section 28. An elongated anvil member 40 interconnects the forward ends of the several arms 38. A handle 42 is pivotally mounted on frame sections 28 for moving anvil member 40 toward and away from clamp surface 34 of base member 32 selectively for clamping sheet stock 44 (FIG. 2) between anvil member 40 and base member 32. With sheet material clamped between the anvil and base members, bend member 36 may be pivoted upwardly by an operator to bend the sheet material over the forward edge of the anvil member. To the extent thus far described, sheet bending brake 22 is similar to that illustrated in U.S. application Ser. No. 09/793,062 filed Feb. 26, 2001, the disclosure of which is incorporated herein by reference for purposes of background.

Figure 3:
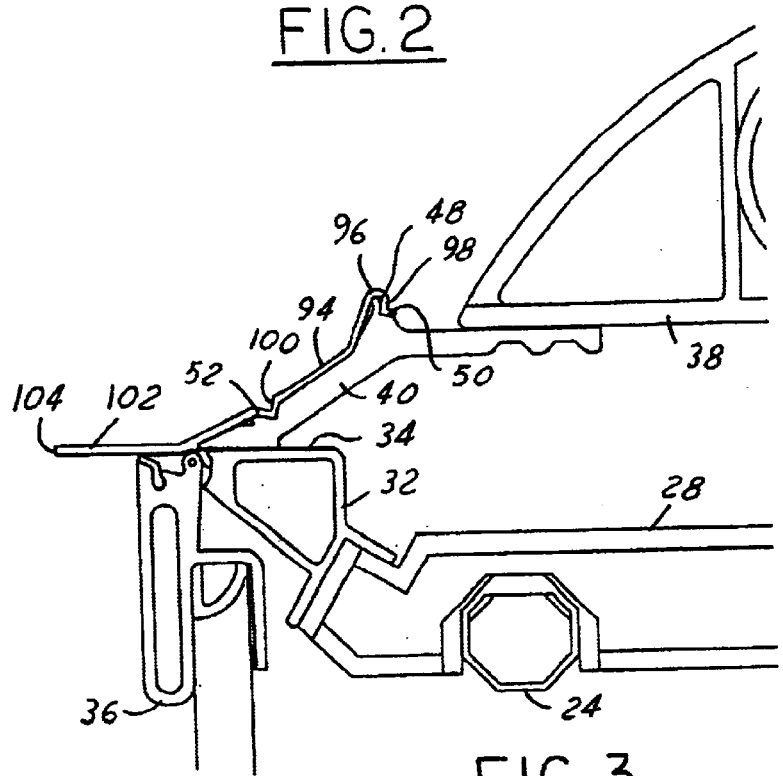
FIG. 3 is a fragmentary end elevational view on an enlarged scale showing location of a cut-off gauge on the sheet bending brake anvil member in accordance with another aspect of the present invention.

Anvil member 40 includes one or more elongated parallel track features for receiving and guiding a sheet material cutter 46 to sever strips of material from a sheet 44 clamped between the anvil and base members. In the embodiment of the invention illustrated in FIGS. 1–3, these track features include a bead or lip 48 extending upwardly from an upper surface of anvil member 40 parallel to the forward edge of the anvil member. Lip 48 is continuous along the upper surface of anvil member 40, as best seen in FIG. 1. A longitudinally extending channel or groove 50 is formed along the rear face of lip 48—i.e., the face of the lip remote from the forward edge of the anvil. A second channel or groove 52 is formed along the upper surface of the anvil member at a position spaced from lip 48 and disposed between lip 48 and the forward edge of the anvil member. Track channels 50, 52 are longitudinally continuous and preferably are V-shaped in cross section, as best seen in FIG. 3. The opposed surfaces of each track channel 50, 52 preferably are at an angle of about 90° to each other.

Figure 4:
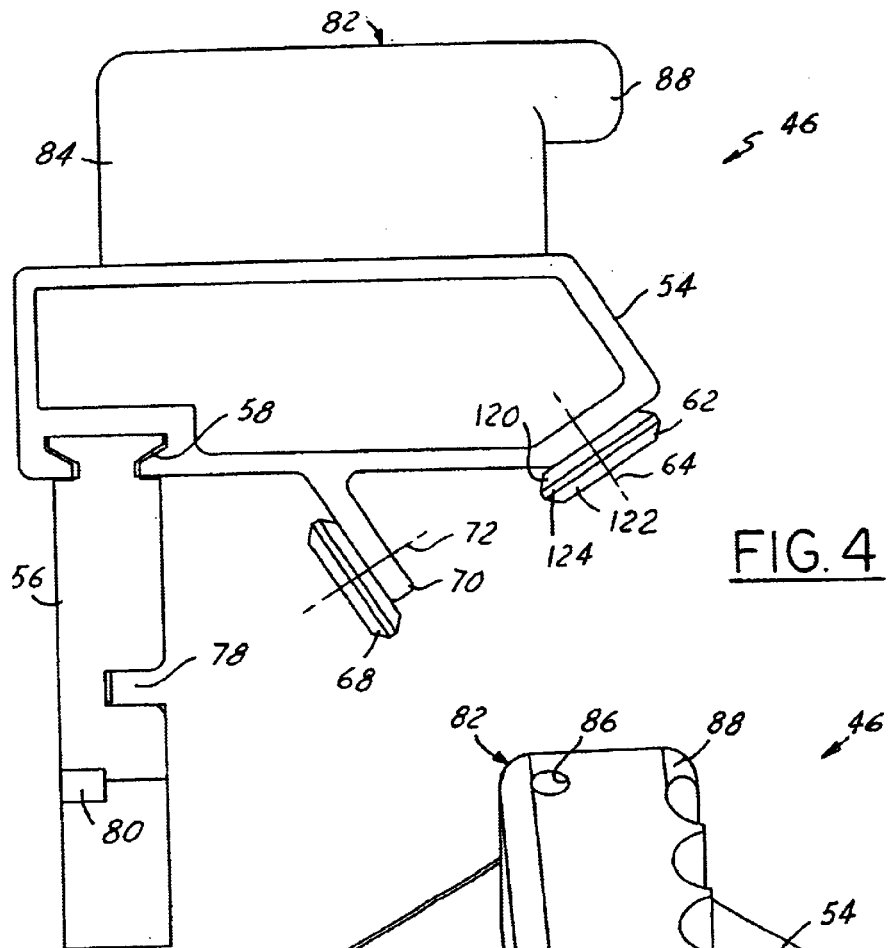
FIG. 4 is an end elevational view of the sheet material cutter illustrated in FIGS. 1–2.
Figure 5:
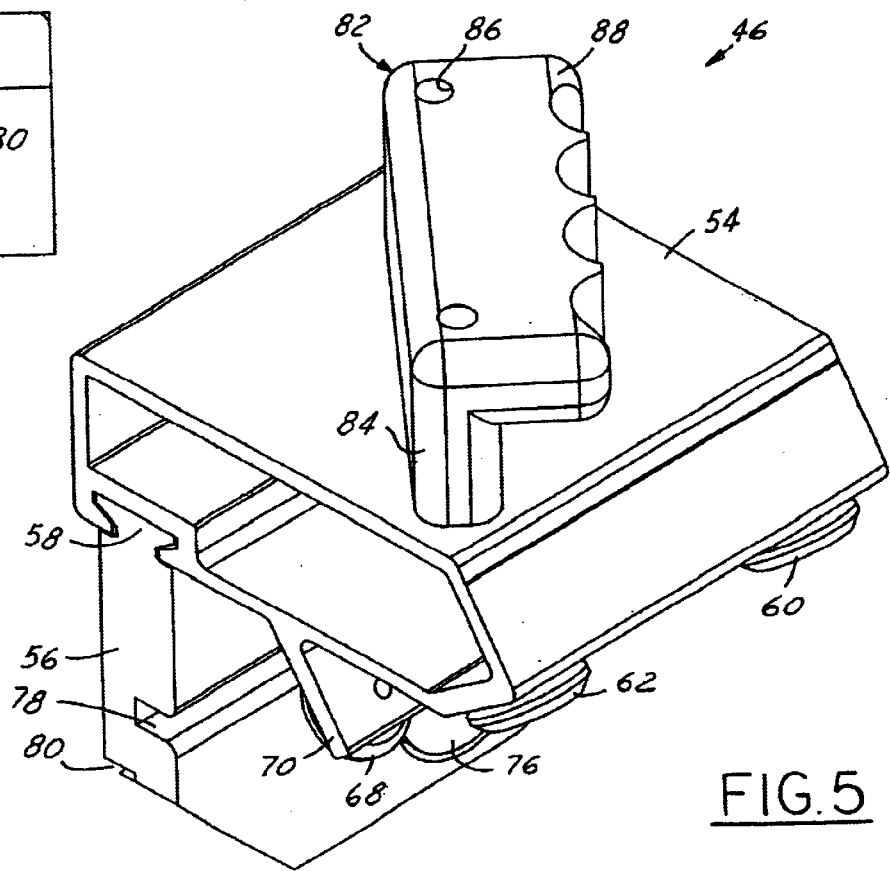
FIG. 5 is a top perspective view of the cutter illustrated in FIG. 4.
Figure 6:
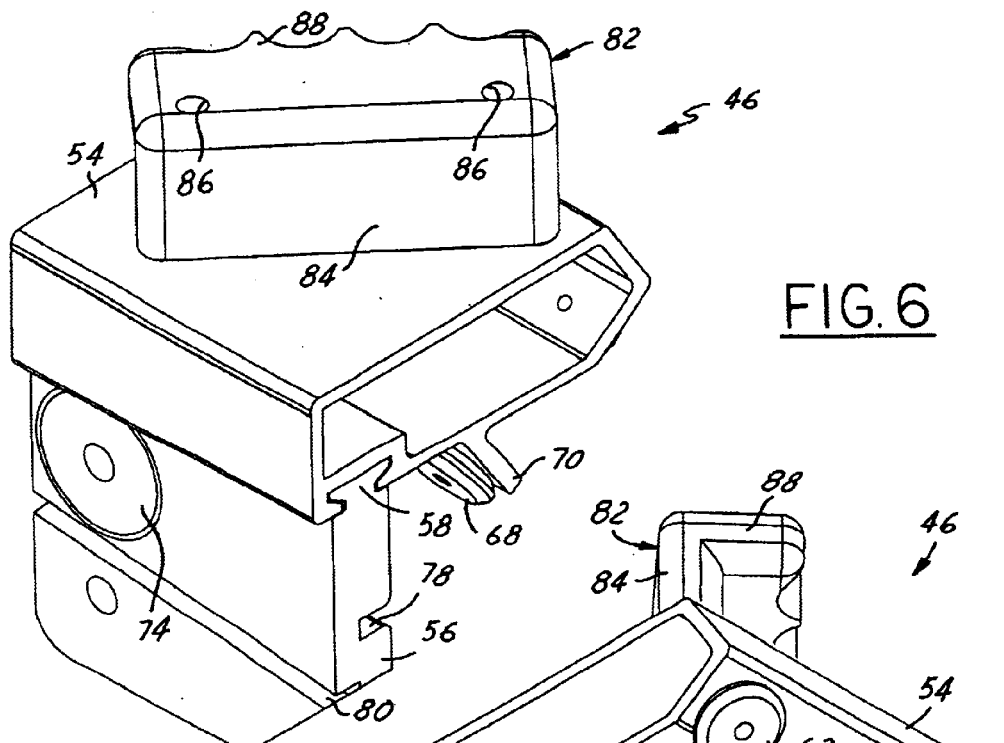
FIG. 6 is a front perspective view of the cutter illustrated in FIGS. 4 and 5.
Figure 7:
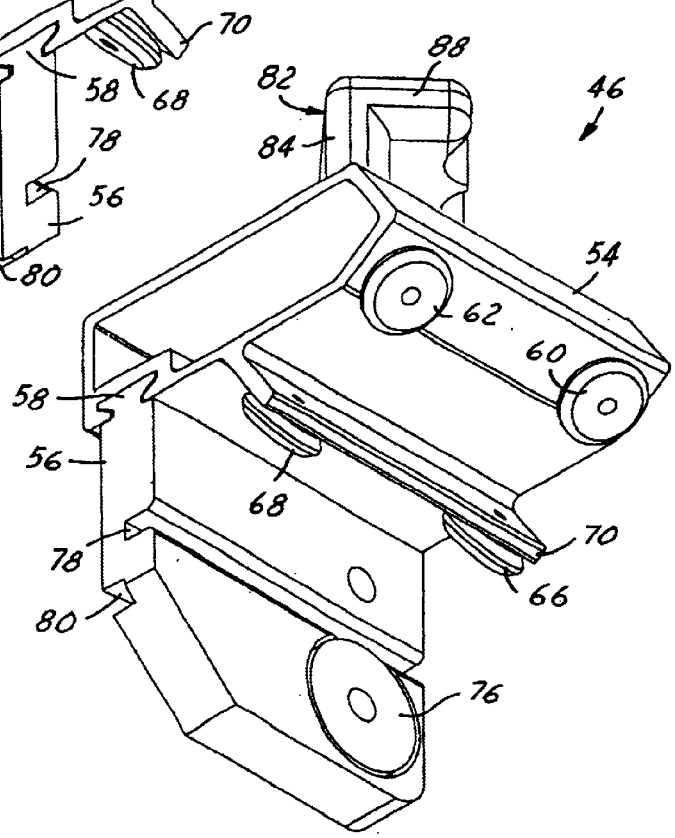
FIG. 7 is a bottom perspective view of the cutter illustrated in FIGS. 4–6.

Cutter 46 is illustrated in FIGS. 1 and 2, and in greater detail in FIGS. 4–7. Cutter 46, in accordance with the exemplary preferred embodiment of the invention illustrated in the drawings, includes a frame 54 to which a bar 56 is secured by means of a dovetail securement arrangement 58. Frame 54 has a hollow box-like cross section for rigidity and reduced weight. A first pair of track rollers 60, 62 are secured to frame 54 and have axes of rotation that lie in a plane 64 (FIG. 4). A second pair of track rollers 66, 68 are mounted on a leg 70 of frame 54, and have axes of rotation that lie in a plane 72. As best seen in FIG. 4, planes 64, 72 are perpendicular to each other, as are the centerlines of track channels 50, 52 (FIG. 3). This perpendicular orientation contributes to stability of the cutter on the anvil member track. Each of the track rollers 60, 62 and 66, 68 have outwardly extending or external V-shaped peripheries, as best seen in FIG. 4. Roller pairs 60, 62 and 66, 68 are spaced from each other on frame 54 such that roller pair 60, 62 may be received in track channel 50 and roller pair 66, 68 simultaneously received in track channel 52 on anvil member 40. Frame 54 and cutter 46 may thus be propelled along track channels 50, 52 of anvil member 40. A pair of cutter rollers 74 (FIG. 6) and 76 (FIG. 7) are mounted on bar 56 of frame 54. The peripheries of cutter rollers 74, 76 are radially overlapped so as to sever strips from sheet material 44 (FIG. 2) as cutter 46 is propelled along track channels 50, 52 on anvil member 40. Channels 78, 80 are formed in bar 56 to guide the edges of the sheet material to and from the cutter rollers. Track rollers 60, 62, 66, 68 preferably are identical. Each has an external V-shaped periphery formed by a pair of angulated conical surfaces 120, 122 (FIG. 4), and an annular radially facing surface 124 that interconnects surfaces 122, 124. The angle between surfaces 122, 124 preferably is 90°. Thus, surfaces 122, 124 are captured and ride between the opposed surfaces of track channels 78, 80 on anvil member 40.

A handle 82 is mounted on cutter frame 54. Handle 82 includes a base 84 with openings 86 for receiving screws to secure the handle to frame 54 of cutter 46. A leg 88 extends forwardly from the upper end of base 54 for gripping by a user. It will be noted in particular in FIGS. 1 and 5–7 that leg 88 of handle 82 is oriented at an angle with respect to the direction of motion of cutter 46 along the track on the anvil member. This angle may be on the order of 45°, but is not critical. Handle 82 is also centered over track roller pair 66, 68, as best seen in FIG. 4. This contributes to the stability of the cutter on the anvil track. The angular orientation of the handle permits the user to stand in front of the sheet bending brake and readily manipulate the cutter without applying forces to the cutter that tend to make the cutter untrack from the anvil member.

Another aspect of the present invention is embodied in the cut-off gauges 90, 92 illustrated in FIGS. 1 and 3. Cutters for use in combination with sheet bending brakes, including cutter 46 illustrated in the present application drawings, sever the sheet stock at a distance from the forward edge of the anvil member that is predetermined by the design of the cutter. This spacing or distance is typically one and one-half inches in the art. Thus, the severed edge of the sheet material after operation of cutter 46 is one and one-half inches from the forward edge of the anvil. This typically requires the user to make extra marks on the sheet material for the purpose of locating the sheet material with respect to the edge of the anvil. For example, if a user desires to cut a ten inch strip of material, a first set of guide marks would be placed on the sheet material ten inches from the edge and a second set of marks 11.5 inches from the edge for purposes of location with respect to the edge of the anvil. Gauges 90, 92 eliminate the need for this extra set of marks or indicia on the sheet material, and allow the sheet material to be located in the bending brake employing the marks at the desired cut position.

Each gauge 90, 92 includes a first portion 94 having a channel 96 for receipt over lip 84 and a V-shaped bead 98 for receipt in channel 50. A second V-shaped bead 100 is positioned for receipt in channel 52 of anvil member 40. A second portion 102 of each gauge 90, 92 is cantilevered from the first portion when the first portion is assembled to the anvil member. The free edge 104 of second portion 102 is parallel to the forward edge of the anvil member, and preferably is spaced from the forward edge of anvil member 40 by a distance that corresponds to the predetermined spacing between the sheet material cut edge and the edge of the anvil member associated with the cutter—e.g., 1.5 inches in the example discussed above. Thus, a pair of gauges 90, 92 may be positioned on anvil member 40 longitudinally spaced from each other, as illustrated in FIG. 1, and employed to locate the sheet material within the bending brake employing the marks or other indicia placed on the sheet material for purposes of locating a desired cut. After locating the sheet material and clamping the sheet material in the brake employing handle 42, gauges 90, 92 are removed and cutter 46 is propelled along the track on the anvil member to sever the sheet stock as previously described. Gauges 90, 92 may be provided as a kit along with cutter 46. Gauges 90, 92, frame 54 and leg 56 of cutter 46 may be of extruded metal material such as aluminum. Gauges 90, 92 alternatively may be of molded plastic or the like.

Figure 8:
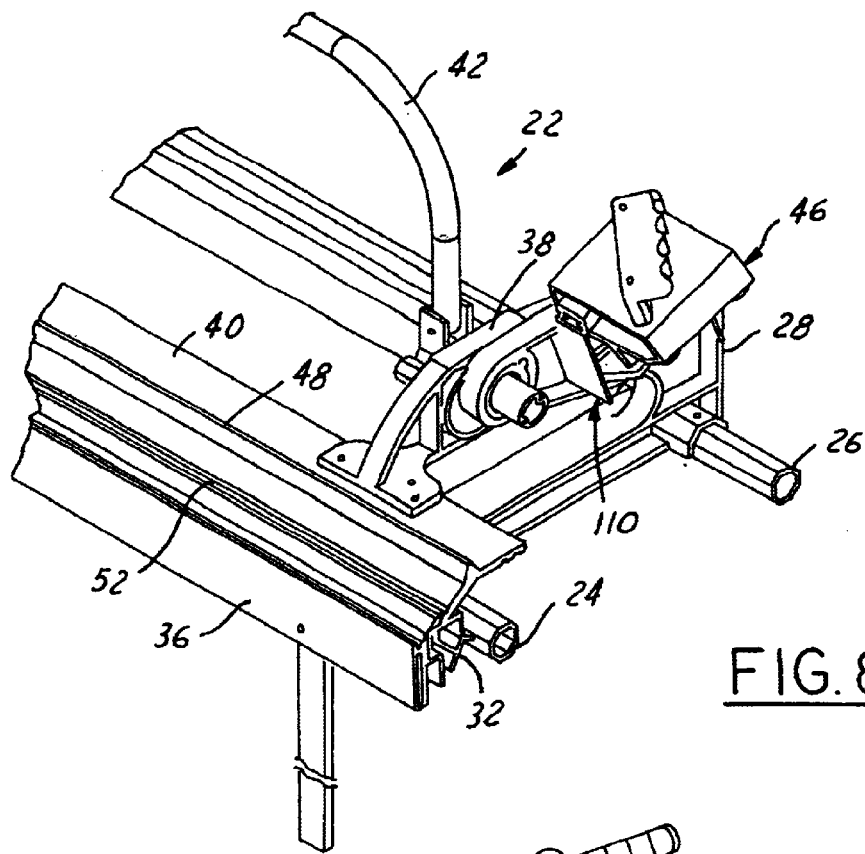
FIG. 8 is a fragmentary front perspective view of a sheet material cutter and bending brake combination illustrating a cutter holster on the bending brake in accordance with another aspect of the present invention.
Figure 9:
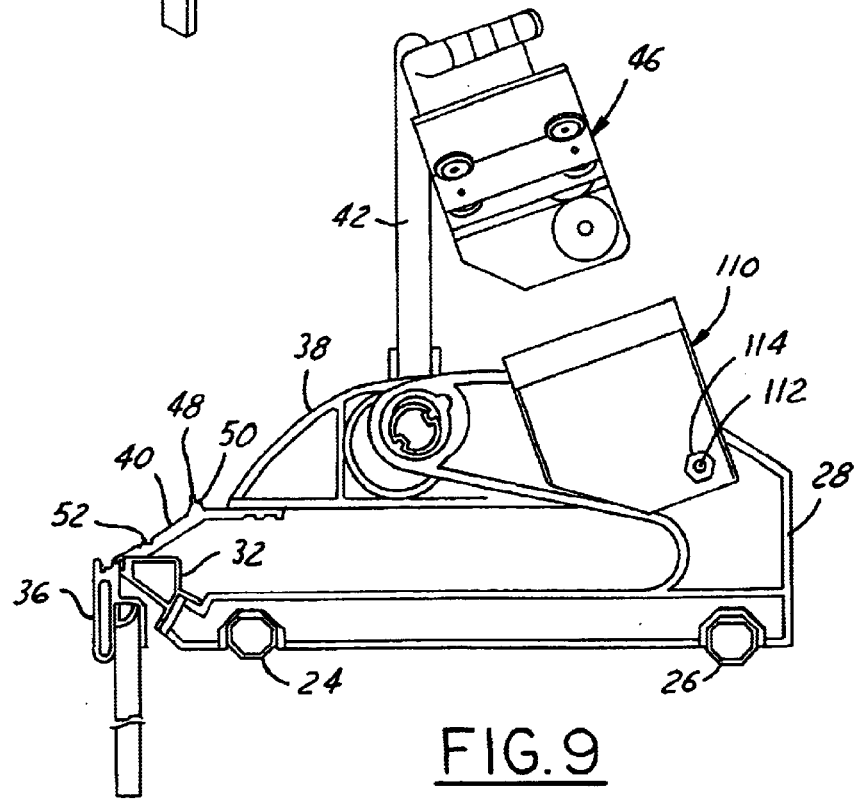
FIG. 9 is an end elevational view of the combination in FIG. 8 showing the cutter exploded from the holster.

FIGS. 8 and 9 illustrate a modification in accordance with yet another aspect of the present invention. A holster 10 is secured to one (or more) of the sheet bending brake frame sections 28 for removable storage of cutter 46. Holster 110 may comprise a formed section of sheet metal, and may be secured to sheet bending brake frame section 28 employing the bolt 112 that pivotally mounts the arm 38 to that section. Holster 110 may be provided in a kit, either separately or along with cutter 46, along with a nut 114 and an illustration how to mount the holster to the sheet bending brake. Cutter 46 may thus be stored on the sheet bending brake during periods on non-use, rather than rested on the ground or suspended from a pin on the brake from which the cutter may fall during use of the brake.

Figure 10:
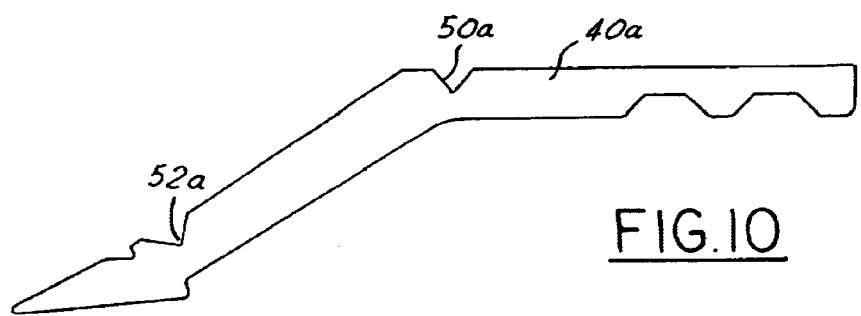
FIG. 10 is an end elevational view of an anvil member having revised track channels in accordance with a modified embodiment of the invention

FIG. 10 illustrates a modified anvil member 40a. The primary difference between the anvil member 40a in FIG. 10 and the anvil member 40 in FIGS. 1–3 is that the lip 48 is eliminated, and that the first groove or channel 50a is disposed on the top of the anvil member. Second track groove or channel 52a is still disposed between first channel 50a and the forward or bending edge of the anvil. Thus, lip 48 in FIGS. 1–3 is primarily to act as a stop to bending of sheet material, and first track 50 may be provided on the back face of the lip, where present. When the lip is not present, the track 50a may be placed on another convenient part of the anvil member. The important point is that track channels 50, 52 or 50a, 52a are parallel to each other, spaced from each other laterally of the longitudinal direction of the brake, and at an angle to each other. The track channels preferably are on surfaces that face away from each other. The angle between the channels helps the cutter against untracking as the cutter is propelled along the brake.

There have thus been described a sheet material cutter, a combination sheet material cutter and sheet bending brake, and a cut-off gauge for use in a combination cutter and sheet bending brake that fully satisfy all of the objects and aims previously set forth. The invention and its several aspects have been disclosed in conjunction with presently preferred embodiments thereof, and a number of modifications and variations have been discussed. Other modifications and variations will readily suggest themselves to persons of ordinary skill in the art. The invention is intended to embrace all such modifications and variations as fall within the spirit and broad scope of the appended claims.

What is claimed is:

1. A sheet material cutter and bending brake combination that includes:

a sheet bending brake having a base member with a clamp surface, and an anvil member for clamping sheet material against said clamp surface, said anvil member having a track extending longitudinally of said anvil member and said brake, said track including a first channel extending along said anvil member at a position spaced from said clamp surface, and a second channel extending along said anvil member parallel to said first channel and disposed between said first channel and said clamp surface, said first and second channels being at an angle to each other, and a cutter having a frame, first and second pairs of track rollers on said frame, said first pair of rollers having an outwardly extending periphery for receipt in said first channel, said second pair of rollers having an outwardly extending periphery for receipt in said second channel, and a pair of cutter rollers on said frame for engagement with sheet material clamped between said anvil and base members when said cutter is mounted in said track.

2. The combination set forth in claim 1 wherein said first pair of rollers have axes of rotation that lie in a first plane, wherein said second pair of rollers have axes of rotation that lie in a second plane, and wherein said first plane is perpendicular to said second plane.

3. The combination set forth in claim 1 wherein said first and second channels have V-shaped cross sections, and wherein said first and second pairs of track rollers have external V-shaped peripheries.

4. The combination set forth in claim 1 wherein said frame has a handle for manipulation of said cutter along said track, said handle being oriented at an angle to the direction of propulsion of said cutter along said track.

5. The combination set forth in claim 1 further comprising a holster mounted on said brake for removably storing said cutter when said cutter is not in use.

6. The combination set forth in claim 1 wherein said frame is such that said cutter rollers sever sheet material along a line at predetermined spacing from said anvil member, and wherein said combination further includes a pair of cut-off gauges for removable receipt over said anvil member, said cut-off gauges extending said predetermined distance from said anvil member and having an edge remote from said anvil member for locating cut indicia on the sheet material at said predetermined spacing from said anvil member.

* * * * *